Figure 1:
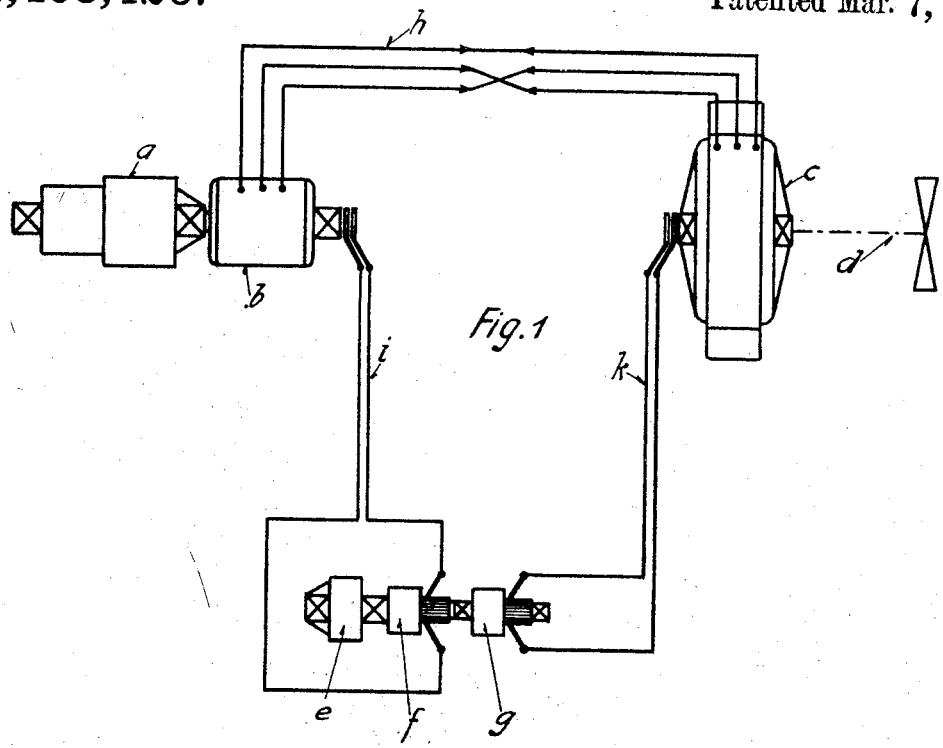

A. AICHELE.
ELECTRICAL PROPULSION OF SHIPS.
APPLICATION FILED SEPT. 30, 1919.

1,408,426.

Patented Mar. 7, 1922.

Inventor
A. Aichele,
By H. R. Kerslake
Attorney

UNITED STATES PATENT OFFICE.

ALBERT AICHELE, OF BADEN, SWITZERLAND, ASSIGNOR TO AKTIENGESELLSCHAFT BROWN, BOVERI & CIE., OF BADEN, SWITZERLAND.

ELECTRICAL PROPULSION OF SHIPS.

1,408,426.  Specification of Letters Patent.  Patented Mar. 7, 1922.

Application filed September 30, 1919. Serial No. 327,581.

*To all whom it may concern:*

Be it known that I, ALBERT AICHELE, a citizen of the Swiss Republic, residing at Wiesenstrasse, Baden, Switzerland, have invented certain new and useful Improvements in and Relating to the Electrical Propulsion of Ships, of which the following is a specification.

This invention relates to the electrical propulsion of ships.

In the propulsion of ships by electrical means it is necessary to use alternating current motors because the attendance of the brushes and commutators of high speed continuous current turbodynamos requires special technical knowledge and skill which is not to be expected from the crew of a ship, and moreover because continuous current generators driven by means of turbines are not built for the outputs which come into question in the present case. For the propulsion of cargo-steamers, the propellers of which are driven at a very low speed, the highest possible speed required for the steam turbine leads to a very high number of poles for the induction motors, and consequently to a bad power factor. In consequence thereof the motor and generator have to be made of such dimensions that the use of the well known induction motors for this purpose appears to be out of the question. On the other hand synchronous motors of ordinary construction which may be adjusted to a power factor equal to one, do not come into question for the solution of the present problem since their use does not render it possible to bring the ship to the full speed or to brake its speed or reverse its course whilst the ship is in full sailing.

The present invention permits the problem to be solved in such a way that only the advantages of both kinds of motors are realized, but not their disadvantages. The invention is based upon the knowledge that in cargo-ships in which the time necessary for the starting and braking is infinitesimally small as compared with the time of operation during the normal sailing, a driving by means of synchronous motors during the normal sailing has important advantages, whilst on the other hand asynchronous motors cannot be dispensed with for starting and reversing, and the invention provides means and ways for realizing the advantages of both kinds of motors without increasing the number of the starting motors. For this purpose use is made for the starting and reversing of the ship of the same motors which are used for the driving during the normal sailing, the motors being driven in the first case asynchronously and in the second case synchronously, whereby very great advantages are obtained.

For the starting and braking period and for the reverse sailing it is sufficient, as it follows from the dimensions of the reverse turbines used in turbine plants for ships, to utilize approximately 40% of the normal output. When working asynchronously the motor has therefore to provide only 40-50% of the normal output. Moreover the same may be dimensioned without taking into account the power factor since this working is only of short duration. On the other hand the normal output is given by the motor in the form of a synchronous motor excited by means of continuous current, that is to say, at a favourable power factor. These considerations lead to a substantial reduction in the dimensions not only of the motor but also of the generator.

For the present purpose the motors used may consist of machines which are provided in a well known manner with projecting poles and with a short circuit winding which is embedded in the pole-shoes in the form of a cage armature; for the purpose of the asynchronous starting under load, this winding has a correspondingly high resistance. However, as the machine has to give a certain output also when it runs asynchronously, it is preferable to choose the magnetic construction of the machines in the same way as in the case of induction motors, the air space between the stator and rotor remaining constant over the whole of the periphery. If the number of revolutions of the machine is nearly synchronous, the excitation winding is connected to the source of continuous current by means of slip rings. The small variations in speed of the synchronously operating machine required during the sailing, are effected by the adjustment of the number of revolutions of the steam turbine driving the generator.

The comparatively high excitation voltage necessitates the use of a great number of turns for the excitation winding of the motor. For this reason a high voltage may occur in this winding when the machine is started asynchronously or when the same is reversed.

In order to prevent the danger of a puncture of the winding which may be caused thereby, the winding of the rotor of the motor may be constructed as a multiphase winding, and one part of its phases may be provided with a differentially acting double winding. This differentially acting part of the winding is employed for the purpose of excitation by means of continuous current in such a manner that the portions of the winding which are arranged to act in opposition with respect to the alternating current, are connected together in parallel with respect to the continuous current. For this purpose continuous current is led in at the points of reversal of the differential winding. The two branches of the excitation winding which from these points onwards are connected together in parallel, may be dimensioned and arranged in such a manner that the heating of the two parts of the winding due to the continuous current excitation shall be approximately the same. The phases of the rotor winding which are not employed for the excitation with continuous current may be constructed as ordinary short circuit windings without differential arrangement.

Fig. 1 in the accompanying drawing shows diagrammatically and by way of example one mode of construction of a plant for the electrical propulsion of ships according to the invention. The steam turbine $a$ drives the generator $b$ which supplies current to the motor $c$ through the leads $h$ for the propulsion of the propeller shaft $d$. The generator $b$ receives its excitation current through the leads $i$ from the exciter $f$, which is driven by means of an auxiliary engine $e$, and a second exciter $g$ is coupled to the same, which permits a continuous current to be sent through the leads $k$ and the slip rings into the winding of the rotating part of the motor driving the ship, for its operation as a synchronous motor.

Figure 2:
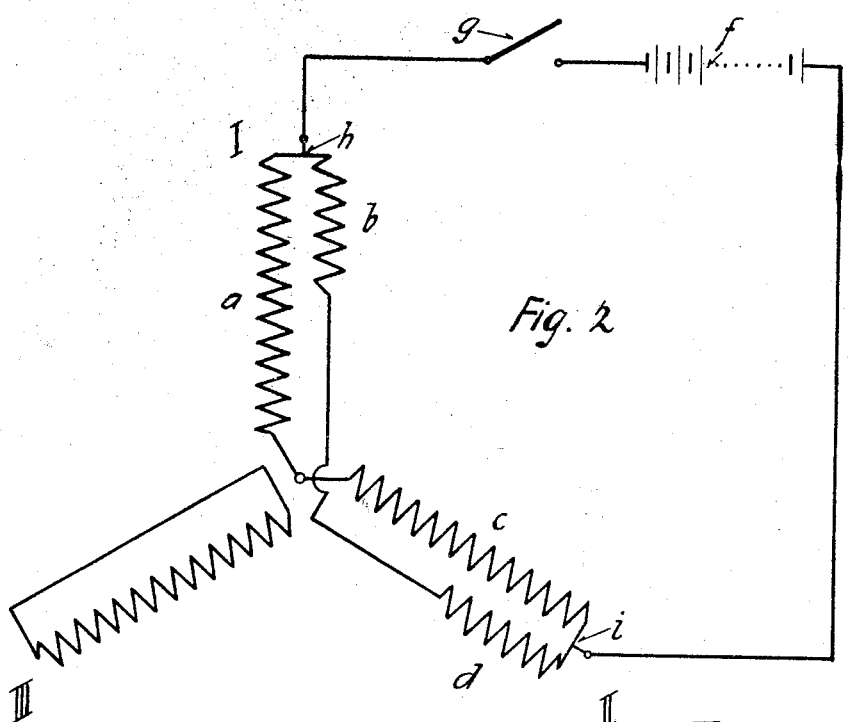

Fig. 2 in the accompanying drawing illustrates diagrammatically and by way of example a three-phase rotor winding which is arranged in this way. Each one of the phases I and II is provided with a double winding consisting of the unequal parts $a$ and $b$, $c$ and $d$ respectively. For the operation of the alternating current generated in the rotor winding during the asynchronous starting, the parts $a$ and $b$ and the parts $c$ and $d$ respectively, are connected together in opposition, so that the voltage in operation is the difference between the voltages generated therein. The phase III is constructed as an ordinary short circuit winding without differential action and may be arranged over the whole periphery of the rotor as an ordinary cage armature.

The supply of continuous current to the two phases I and II, each of which is constructed as a differential winding, is effected by means of a source of continuous current $f$, from which the current is led to the reversal points $h$ and $i$ of the two phases over slip rings and through the intermediary of a switch $g$. The continuous current flows through the parts $a$ and $b$, $c$ and $d$ respectively of the two phases in parallel.

What I claim is: —

1. An arrangement for the electrical propulsion of ships, including a propeller, an alternating current generator, a polyphase asynchronous motor having an additional winding in parallel with a phase of the secondary winding of said motor, a source of direct current and means including a switch for connecting in series said secondary and said additional winding with said source of direct current.

2. An arrangement for the electrical propulsion of ships including a propeller, an alternating current generator, a polyphase asynchronous motor having a differential winding on one phase of the secondary winding, a source of direct current, means for connecting said differential winding at the reversal points of the differential connection to said source of direct current, the ohmic resistance of the two windings of said differential winding connected in opposition to each other being selected to attain approximately the same temperature during excitation.

3. An arrangement for the electrical propulsion of ships including a propeller, an alternating current generator, a polyphase asynchronous motor having a differential winding on a phase of the secondary winding, a source of direct current, means for connecting said differential winding at the reversal points of the differential connection to said source of direct current, the ohmic resistance of the two windings of said differential winding connected in opposition to each other being selected to attain approximately the same temperature during excitation, and a secondary phase which is not wound differentially being constructed as an ordinary short circuit winding.

In testimony whereof I have signed my name to this specification.

ALBERT AICHELE.